Feb. 20, 1951 R. E. FRANKLIN ET AL 2,542,651

TEMPERATURE COMPENSATED PIEZOELECTRIC CRYSTAL HOLDER

Filed March 8, 1949

INVENTORS
RALPH E. FRANKLIN
& WILLIAM A. MILLER
BY Harry Tunick
ATTORNEY

Patented Feb. 20, 1951 2,542,651

UNITED STATES PATENT OFFICE 2,542,651

TEMPERATURE COMPENSATED PIEZO-ELECTRIC CRYSTAL HOLDER

Ralph E. Franklin, Patchogue, N. Y., and William A. Miller, Altadena, Calif., assignors to Radio Corporation of America, a corporation of Delaware Application March 8, 1949, Serial No. 80,142

8 Claims. (Cl. 171—327)

This invention relates to a new and useful piezoelectric crystal holder which is particularly adapted to support high frequency crystals oscillating in a thickness mode such as for example X-cut crystals or preferably AT or BT or similar cut crystals which oscillate in a length-thickness shear mode which are used for frequency control of radio transmitters and for crystal filters.

An object of this invention is to improve the means and method of supporting high frequency piezoelectric crystals in order to obtain a more accurate frequency control.

A feature of this invention is the novel means of supporting the crystal plate-like vibrating element at its edges by a slotted crystal electrode spacer having the same temperature coefficient of expansion as the crystal, and preferably cut from the same mother crystal on the same axis.

High frequency crystals used for frequency control are usually cut so that they have zero or nearly zero temperature coefficient of frequency over a narrow range of temperature and the usual crystal holders have been found to have several faults and disadvantages. In some of the prior art type of crystal holders the crystals are clamped at the corners by the electrodes to prevent motion of the crystal other than in the desired mode of oscillation, but it has been found that this clamping damps the oscillation somewhat and lowers the Q of the equivalent circuit. In other types of crystal holders the electrodes are spaced to give an air gap and the crystal is free to oscillate without damping but is too free to move in the gap, allowing a frequency change due to changing gap capacity with lateral motion of the crystal.

In other types of holders the electrodes are mounted on insulating material that may change its dielectric constant with changing temperature and humidity, thus changing the frequency due to the changing air gap capacity.

In still other types of crystal holders the electrodes are plated on the large crystal surfaces and the holder is really composed of the leads which are soldered to the electrodes. In this type of holder some damping is present due to the electrodes being carried by the crystal. Also there is liable to be a small area of electrical twinning under the spot where the connection leads are soldered to the electrodes. This twinning is due to the heat present when the leads are soldered to the electrodes. In this type of holder the supporting wires also add to the damping and lower the Q of the crystal. The features of our improved crystal holder are such as to overcome the disadvantages and faults of the prior art type of crystal holders.

Figure 1:
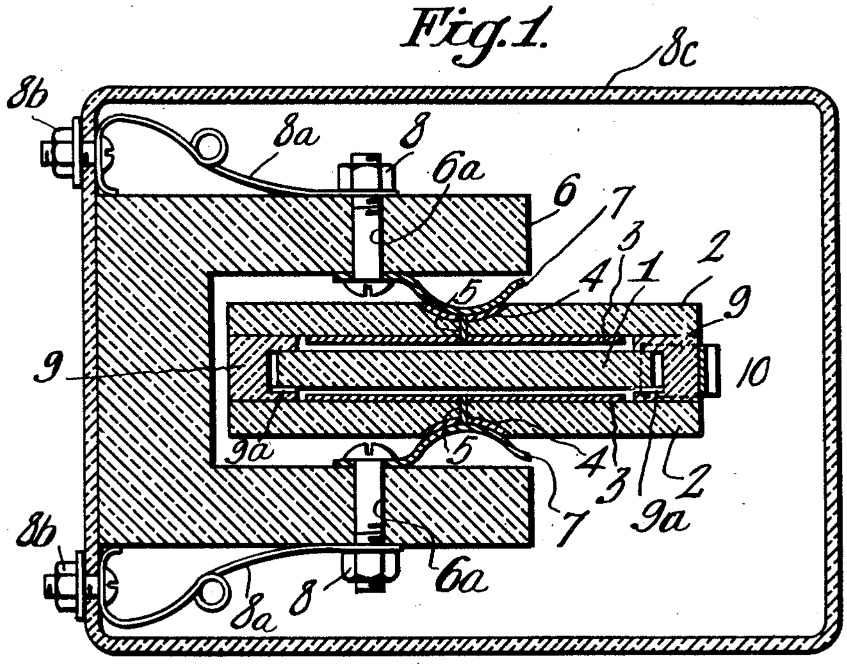
Figure 2:
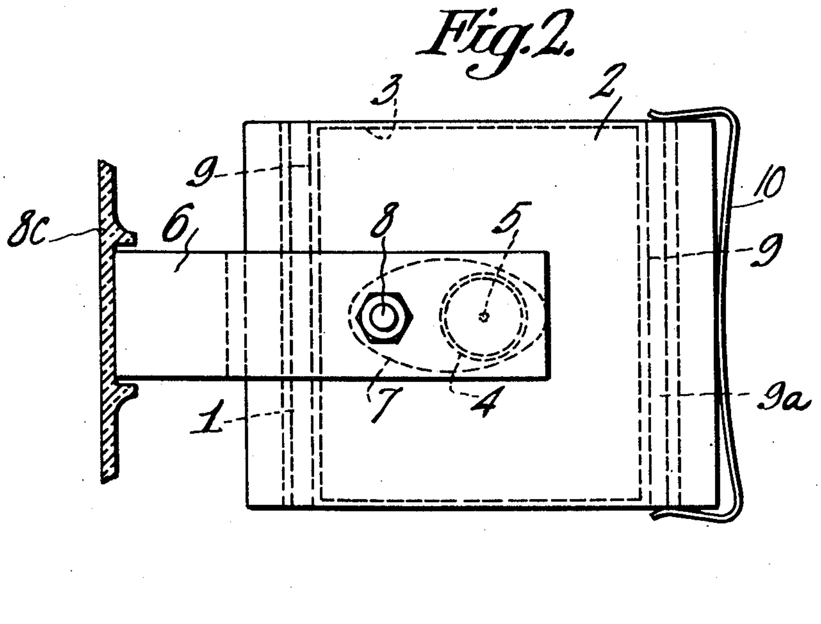

This invention may be more clearly understood by referring to the accompanying drawing in which;

Fig. 1 is a cross-section of the crystal holder and crystal of this invention; and Fig. 2 is a top view of Fig. 1.

Referring now in detail to Figs. 1 and 2 of the drawing the quartz piezo crystal element 1 is of the type which is cut for a thickness mode of oscillation or a length-thickness shear mode. Located on each side of the crystal 1 are two crystal electrode support members 2. The electrode supports are made of insulated material such as crystal quartz, fused quartz, ceramic or of any other low thermal expansion material having the necessary insulating qualities. The electrode support members are plated or evaporated with metal such as, for example, silver or copper on the face nearest the crystal with an area slightly smaller than that of the crystal element area for reasons which will be explained in more detail later. Since the electrodes are put on by vaporization in a vacuum, the exact shape and position of the coating can be determined by means of a metal mask in the form of a support while the coating is being done. A metal coated concave recess 4 is located on the opposite side from that of the plated electrode on each one of the supports 2. The metalized recess 4 is preferably concave or slightly semi-spherical. In the central portion of the spherical recess there is located a small hole or aperture 5 through which solder or a soldered wire is placed to make an electrical connection between electrodes 3 and the concave metalized surface 4. A supporting yoke 6, preferably of insulating material, is arranged for carrying and mounting the crystal holder. Each arm of the yoke 6 has an aperture 6a through which suitable nuts and bolts 8 are arranged to retain a Phosphor bronze spring 7 for making electrical connection to the electrodes and for clamping the holder together at the central portion thereof. A flexible lead 8a makes an electrical connection from nut 8 to terminal 8b which passes through the envelope 8c. Lead 8a may extend at its outer end to the walls of yoke 6 to keep the yoke in position. Two slotted side crystal electrode spacers 9 which are made of crystalline quartz of the same mother crystal and cut at the same angle as crystal 1 are provided for holding the crystal approximately centrally in the gap provided between electrodes 3, the gap means being provided by having a milled groove or slot 9*a* of such a width as to hold the crystal centrally in the gap with enough air gap or clearance to prevent any damping of the crystal. The slots 9*a* can be easily milled in the quartz by a diamond saw. The width of slots 9*a* is determined by the necessary spacing of the electrodes and should be such as to have a width somewhat less than the air gap spacing so that the slot approximately centers the crystal in the gap. In holders in which the crystal rests on one electrode, the other is spaced therefrom a distance of from 1½ to 3 mils (.0015" to .003"), depending upon the frequency of the crystal. It is understood that the frequency range for these dimensions is from 1 megacycle to 5 megacycles. The smaller gap is for the higher frequency. In the present invention this air gap is divided between the two sides of the crystal so that the spacing will be half the above figures for each side of the crystal. To prevent any serious lateral motion of the crystal in the slot of the holder there is provided a Phosphor bronze spring 10 which is bowed slightly upward near each end and the ends of the spring are bent downward to contact each end of one of the spacers 9. As mentioned above the piezoelectric crystal supports 2 are plated with an area slightly smaller than the crystal area so that the plate area does not overlap the spacers 9 to thus cause a short circuit or to permit the spacers to oscillate, since they are made of crystalline quartz. It is preferable that the holder be mounted in the envelope 8*c* which is pumped out, providing a partial vacuum to prevent air damping. The holder may be mounted in either a horizontal or a vertical position within the envelope 8*c* by any suitable means for attaching the yoke 6 to one of the walls of the envelope 8*c*. In another modification the yoke 6 may be metal, in which case the supporting springs 7 and the bolts 8 would have to be insulated by means of insulating bushings (not shown).

It is to be understood that although this type of crystal holder is particularly adapted for high frequency crystals in the thickness oscillation mode for use in high frequency control of radio transmitters and for crystal filters, the holder may also be used for other purposes known to those skilled in the art and is, therefore, not to be limited to the precise arrangement described.

What we claim as our invention is:

1. A piezoelectric crystal holder comprising a pair of support plates having electrodes on confronting faces, a piezoelectric crystal interposed between the electrodes on said support plates, and means to support said crystal along a marginal area near opposed edges, said means including spacers made of crystal material having the same temperature expansion characteristic as that of said piezoelectric crystal, said spacers being positioned between said support plates.

2. A piezoelectric crystal holder comprising a pair of insulating support plates having electrodes on confronting faces, a piezoelectric crystal interposed between the electrodes on said support plates, and means to support said crystal at its marginal edges including spacing means for said support plates made from a crystal cut from the same mother crystal as is said piezoelectric crystal and having the same cut.

3. A piezoelectric crystal holder comprising a yoke member, a pair of insulating support plates positioned within the arms of said yoke member, said insulating support plates having electrodes on confronting faces thereof, a piezoelectric crystal interposed between the electrodes on said support plates, and means to support said crystal at its edges, said means comprising slotted spacers for said support plates made from a crystal having the same temperature expansion characteristic as has said piezoelectric crystal, said crystal having opposed edges positioned in the slots of said spacers.

4. A piezoelectric crystal holder comprising a yoke member, a spring secured to each arm of said yoke member, a pair of insulating support plates positioned within the arms of said yoke member and retained by said springs, said insulating support plates each having electrodes on confronting faces thereof, a piezoelectric crystal interposed between the electrodes on said support plates, and spacer means having a slot to support said crystal at its edges and functioning to space said support plates, said slot being slightly greater in width than the thickness of said crystal, said spacer means being made of a material having the same temperature coefficient of expansion as has said piezoelectric crystal.

5. A piezoelectric crystal holder comprising a pair of support plates each having electrodes on confronting faces thereof, a piezoelectric crystal interposed between the electrodes on said support plates, and means to support said crystal at at least two marginal edges, including spacers for spacing said support plates apart, said spacers being made from a crystal cut from the same mother crystal and being of the same angular cut as said piezoelectric crystal and having slots therein of such a width as to permit the piezoelectric crystal to oscillate freely.

6. A piezoelectric crystal holder comprising a pair of support plates each plate having electrodes coated on confronting faces thereof, a piezoelectric crystal interposed between the electrodes on said support plates, means for supporting said crystal at its marginal edges in an operative position to permit the piezoelectric crystal to oscillate freely, said means including spacers for said support plates made from a crystal cut from the same mother crystal and being of the same cut as said piezoelectric crystal, said spacers each having a slot therein within which said crystal fits, and a spring member secured to at least one of said crystal supporting means and positioned to retain said piezoelectric crystal within the slot.

7. A piezoelectric crystal holder comprising an envelope partially evacuated having located therein a pair of support plates each having electrodes on confronting faces, a piezoelectric crystal interposed between said electrodes on said support plates, supporting means to retain said crystal at its edges, said supporting means including spacers for said support plates having the same temperature expansion characteristic as has said piezoelectric crystal.

8. A piezoelectric crystal holder comprising an evacuated chamber having a yoke member secured therein, a spring secured to each arm of said yoke member, a pair of insulating support plates positioned within the arms of said yoke member and retained in position by said springs, said insulating support plates each having an aperture therein and having electrodes on confronting faces thereof, means passing through the aperture of each one of said support plates to make electrical connection with said springs and with said electrodes, a piezoelectric crystal interposed between the electrodes on said support plates, means to support said crystal at portions of its marginal edges, said last mentioned means including slotted spacers for said support plates made of a crystal having the same temperature coefficient of expansion as has said piezoelectric crystal, and terminal means passing through a wall of said chamber to provide external electrical connection to said springs.

RALPH E. FRANKLIN.
WILLIAM A. MILLER.

REFERENCES CITED

The following references are of record in the file of this patent:

UNITED STATES PATENTS

| Number | Name | Date |
|---|---|---|
| 2,076,060 | Bechmann et al. ----- | Apr. 6, 1937 |